Aug. 2, 1960 W. R. JOHNSON 2,947,864

APPARATUS FOR RECORDING TELEVISION SIGNALS

Filed Dec. 5, 1955 2 Sheets-Sheet 1

INVENTOR.
WAYNE R. JOHNSON
BY Lippincott & Smith
ATTORNEYS

Aug. 2, 1960 W. R. JOHNSON 2,947,864

APPARATUS FOR RECORDING TELEVISION SIGNALS

Filed Dec. 5, 1955 2 Sheets-Sheet 2

INVENTOR.
WAYNE R. JOHNSON
BY
Lippincott & Smith
ATTORNEYS 2,947,864

APPARATUS FOR RECORDING TELEVISION SIGNALS

Wayne R. Johnson, Los Angeles, Calif., assignor, by mesne assignments, to Minnesota Mining & Manufacturing Co., St. Paul, Minn., a corporation of Delaware Filed Dec. 5, 1955, Ser. No. 550,871

9 Claims. (Cl. 250—27)

This invention relates to amplifiers for use in magnetic recording equipment adapted for recording television and like broad-band signals, particularly where interspersed with cyclically recurring pulses representative of a reference amplitude level, such as the blanking signals employed for setting the "black level" in television signals. Specifically, the amplifier of this invention is designed for use in the recording and reproduction or play-back of signals by the method described and claimed in a patent application Serial No. 550,894 filed herewith by the present inventor entitled "Method of Recording and Reproducing Television Signals," now Patent No. 2,913,520.

It is well known that the frequencies in television signals, as transmitted under present United States standards, occupy a frequency band extending, at least theoretically, from zero to 4 mc. The frequencies within this band can be divided, by various methods of band splitting, into a plurality of channels of less width, but even so it is desirable to use as few channels as possible. Thus, one method divides the signals into two channels, one extending up to 2 mc., the other including the frequencies from 2 to 4 mc., thus making each channel carry a band of 2 mc. bandwidth.

It is also well known that in magnetic recording and reproduction the signals delivered from the transducer used in reproduction or play-back have a waveform which is proportional to the first derivative, with respect to time, of the recorded signals, and it follows that signals recorded at equal amplitudes, appear in the play-back at amplitudes proportional to frequency. In narrower band signals, such as are developed in the recording of sound, the distortion produced by the method of play back is compensated by using an integrating amplifier, which, within a band for which the play-back amplifier is designed, restores the waveforms substantially to those of the signals originally recorded. There is, however, a limit to the band width within which such frequency compensation by integration in the play-back amplifier can be extended. For signals of very low frequency the rate of change of amplitude is so small that it is completely masked by high frequency noise inherent in the recording medium or in the reproducing amplifier. In the system of band division mentioned above, for instance, it is feasible to compensate so as to get substantially flat reproduction from about 10 kc. up to the 2 mc. upper cutoff of the band which it is desired to record. For frequencies below 10 kc., the amplitude of the signals played back falls off approximately 6 db per octave.

It is well known to extend the band of frequencies which can be handled by recording apparatus of various kinds by "pre-emphasis" of signals which would be reproduced at a lower level than other signals in the band in the absence of such pre-emphasis. With ordinary methods of pre-emphasis, however, there is a limit to which this process can be carried. The lowest frequency appearing to any substantial degree is most television signals is the field frequency of 60 cycles per second, although there are some components of 30 cycles and below. The very lowest frequencies can be effectively restored by the so-called "D.C. restorer" circuits customarily used in television receivers. In order to provide low frequency compensation by pre-emphasis of a 60 cycle signal to match the play-back amplifier mentioned above, would require that its amplitude be increased 333 times, or over 45 db. Since the dynamic range of the best sound recording media is about 60 db, and that of media for recording television signals only about 30 to 35 db, such conventional pre-emphasis would utilize more than the entire dynamic range of the medium. Therefore, while such usual types of pre-emphasis have a limited use, they are not really satisfactory.

In accordance with the method of recording and reproduction as described in my above-identified concurrently-filed application Serial No. 550,894, the signals to be recorded are partially integrated before recording; that is, the signals are reformed or distorted by adding to a component corresponding in amplitude to the original signals a component proportional to the time integral of each frequency component. The integration process is, however, carried out only for intervals between the reference level or blanking pulses which occur, in television signals, at the end of each line. During the blanking interval the integration process is discontinued and the values of the integrated components are brought back to zero, the integration starting anew at the beginning at each line. With the signals which are transmitted under present standards, this process permits of the recording of even direct current components of the signal, at maximum amplitudes, (in the case of the 0–2 mc. band here used as an illustration) less than 13 db higher than those of the highest frequencies to be recorded, the higher frequencies appearing on the recording medium at constant amplitude. The sudden discontinuation of the integration and the bringing back of the signals to a reference level results in the generation and recording of a spurious, high-frequency pulse which has no counterpart in the original signals. In the method described this pulse is effectively shorted out or otherwise removed in the play-back process, to restore the reproduced signal to substantially the form of the signal supplied to the recording apparatus.

Broadly the object of the present invention is to provide an amplifier which will perform the necessary operations of partial integration and restoration of the signal to the reference level. In order to accomplish this broad object, among the specific objects of the invention are to provide an amplifier of simple construction which will perform the necessary operation; to provide an amplifier which utilizes only well known and time tested components; to provide an amplifier which is little, if any more expensive than amplifiers of conventional type; to provide an amplifier which is not critical of adjustment, subject to unusual deterioration, nor requiring particular skill to operate; to provide an amplifier by means of which television signals can be recorded without a low-frequency cut-off; to provide an amplifier through the use of which the entire theoretical bands may be realized where band-splitting methods of recording and reproduction are used; and, particularly, to provide an amplifier which may, by proper design, give frequency compensation down to and including direct current components.

Broadly considered, the apparatus of the present invention comprises an amplifying device, such as a high-impedance amplifier tube (preferably a pentode or tetrode) that delivers an output current which varies substantially in direct proportion to variations in amplitude of the signal to be recorded. The output circuit of this amplifier includes a wave forming network the essential elements whereof are a resistor and a condenser in series and preferably, although not necessarily, there is provided in parallel with the condenser a high-impedance circuit for supplying to the amplifier its average or normal current. "High impedance" in this connotation means high as compared to the impedance of the condenser at the frequency of recurrence of the blanking pulses, or other reference-level pulses in the signal to be recorded. Also included in the output circuit of the amplifier are connections for applying the alternating components of the signal to be recorded to the input of a succeeding amplifier. A clamp circuit is connected to the output circuit of the amplifier and is adapted, when supplied with an actuating pulse, to clamp or restore this circuit to a reference or a "zero axis" level, and means are provided for supplying the clamp circuit with such actuating pulses during the intervals at which the reference level or blanking pulses occur.

The above will be more clearly understood by reference to the accompanying drawings, wherein.

Figure 1:
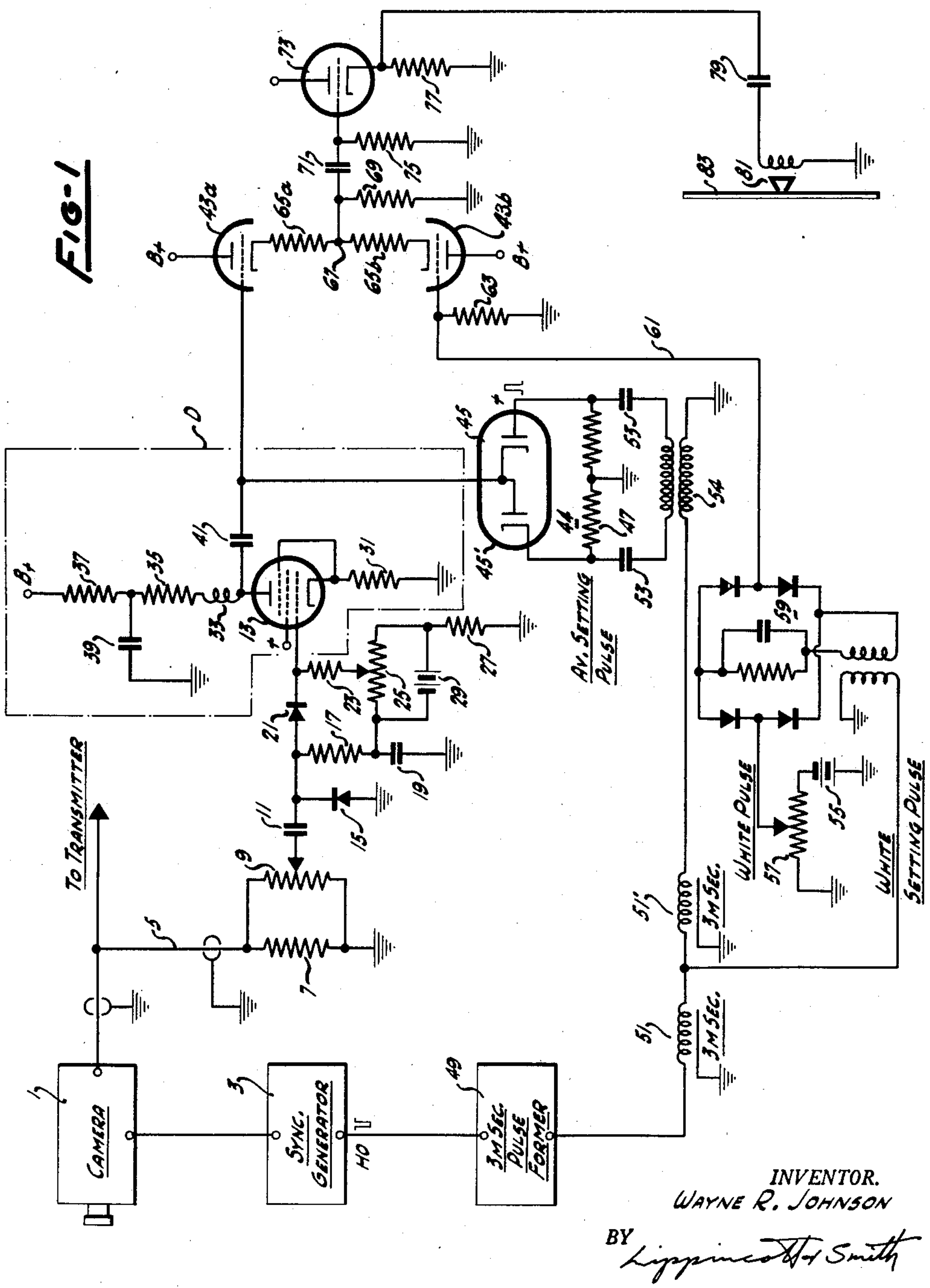
Fig. 1 is a diagram, partly schematic and partly in block form, of a recording circuit in accordance with the present invention.

In the form of the invention illustrated in Fig. 1, the signal to be recorded is assumed to be that developed by a commercial-type television camera 1 which is supplied with its scanning, blanking, and synchronizing signals from a conventional sync generator 3. It is assumed that the signal is being transmitted simultaneously with its recording for later transmission over the same or other station, and therefore that synchronizing as well as blanking pulses are present in the signal to be recorded. The signals could, of course, emanate from a distant transmitter and be received over a coaxial line, or be picked up from either a commercial television station or a remote pickup. In any of these cases, both synchronizing and blanking signals will be present. If the signals are locally generated for recording only, so that synchronizing pulses need not be inserted in the signal, the apparatus to be described can be slightly simplified, as will be described in connection with the specific equipment thus affected. Since the source of the signals to be operated upon is not directly related to the present invention it is shown in highly symbolic form. Moreover, it is also assumed that in the system of which this particular equipment forms a part compensation down to two or three octaves below the play-back cut-off is adequate. This permits some simplification of the apparatus; equipment for compensation down to field or frame frequencies will be described hereinafter.

The signals to be recorded, from whatever source derived, are indicated as supplied through a coaxial lead 5 to a level adjuster comprising, in the present case, a fixed resistor 7 in parallel with a gain-control potentiometer 9, the movable contact of the gain control connecting to a blocking condenser 11, which connects, in turn, to the control grid of an amplifier tube 13. This tube is preferably a pentode or other suitable type having very high plate impedance, for example greater than a few megohms, so that its anode current is substantially proportional to its input voltage, irrespective of the load in the anode circuit, and its amplification is therefore substantially directly proportional to its load impedance.

As supplied to the equipment illustrated, zero illumination, the level of which is indicated by the blanking pulses, is represented by negative signals, the synchronizing pulses being "blacker than black." D.C. restoration is supplied by a rectifier 15 connecting from the condenser 11 to ground and so poled as to pass and effectively short negative signals to ground, thus charging condenser 11 positively when the input voltage swings back to its average value and thus setting the average potential of the grid positive, with respect to ground, by the amount of the maximum negative swing of the input signals.

The clipping circuit for removing that portion of the negative pulse which exceeds the blanking level comprises a shunt circuit connecting to ground from the output side of condenser 11 which includes a resistor 17 and condenser 19 in series. Following this shunt path, a rectifier 21, poled to pass positive signals, is connected in series with the grid of tube 13. Between the rectifier 21 and the grid there is connected a biasing circuit which includes a high ohmage leak resistor 23 which connects to the movable contact of a potentiometer 25, connecting from the junction between resistor 17 and condenser 19 to another leak resistor 27 connecting to ground. The biasing source 29 connects across the potentiometer 25.

The D.C. restorer rectifier 15 charges condenser 19 to very nearly the same positive potential as condenser 11, the resistor 17 being relatively low in resistance in comparison with resistor 27. Resistor 23, as indicated above, is relatively high in value. Through this latter resistor there is applied to the grid of tube 13 and the output side of rectifier 21 a voltage which can be adjusted by means of the potentiometer 25 to equal the difference between black level and the extreme negative value of the synchronizing pulses. The time constant of the circuit including condensers 11 and 19 and the leak resistors 17 and 27 is preferably made quite long in comparison with the period of the lowest frequency to be compensated in the recording, so that the potential applied from condenser 11 to the rectifier 21 due to the charge stored on these condensers is sensibly constant between synchronizing pulses. Rectifier 21 therefore conducts until the voltage due to the condenser charge is equal to the voltage drop across the potentiometer 25 from condenser 19 to the movable contact of the potentiometer. At this point conduction ceases and the potential of the grid remains constant, until the signal voltage again rises above that at which conduction ceased. The bias voltage set on the potentiometer 25 is made equal to the amplitude of the synchronizing pulses. As supplied to the control grid of tube 13 the signal therefore includes the picture and blanking pulses only, the synchronizing pulses being clipped out. Other known forms of clipping circuits may be employed, and, in fact, no clipping circuit is strictly necessary, but clipping is desirable since it conserves dynamic range of the recording medium and thereby extends the range in frequency to which compensation may be effected with tubes of a given distortionless output capacity.

Tube 13 is, as stated above, one having very high dynamic impedance, such as the pentode shown. It is provided with the usual cathode resistor 31 for biasing the cathode and is supplied with screen grid and anode potentials from a suitable source, not shown.

The anode circuit of tube 13 constitutes the low-frequency compensating circuit proper. Reading from the tube anode to B+, this circuit comprises a small inductance or peaking coil 33, a resistor 35 and a second resistor 37, with a condenser 39 connecting from the junction of the two resistors 35 and 37 either to ground, as shown, or to B+. The peaking coil 33 is for the purpose of compensating the "aperture effect" of the play-back transducer; this effect is responsible for the high frequency cut-off of magnetic equipment of this character. At the frequencies compensated in accordance with this invention the impedance of coil 33 can be entirely neglected in comparison with that of resistors 35 and 37. In the ensuing discussion these resistors will therefore be treated as though they were the only series elements between the anode and B+ as, in effect, they are.

The highest frequency at which the compensator begins to take effect is determined by the time constant of the combination comprising resistor 35 and condenser 39; the low frequency limit to which compensation is carried is determined by the time constant of condenser 39 in combination with resistor 37.

In considering the operation of the circuit it may be assumed, for illustrative purposes, that the play-back amplifier is integration-equalized down to a cut-off frequency of 10 kc.; i.e., that at 10 kc. signals are reproduced at a level 3 db below signals of materially higher frequency recorded at the same level of magnetization, the level of reproduction falling off at approximately 6 db per octave below the cut-off frequency. To provide the proper low-frequency compensation the output of amplifier 13 must therefore be up 3 db at 10 kc., rising approximately 6 db per octave throughout the range for which compensation is provided. Above 10 kilocycles the output of the amplifier falls as that of the play-back amplifier rises, assuming a substantially constant value throughout the upper portion of the band to be recorded and reproduced.

Taking the cut-off of the play-back amplifier, therefore, at 10 kc., a reasonable value for the resistor 35 would be approximately 2,000 ohms. The condenser 39 is selected so that at the cut-off frequency its reactive impedance is equal to the resistive impedance of resistor 35. In the illustrative case this would require a capacity of 0.008 microfarad.

Resistor 37 is chosen to provide the low frequency limit of compensation, which may be defined as the frequency at which the overall response of the system is 3 db down. Thus, if it is deemed necessary to carry the low-frequency compensation only about a single octave below that provided by the play-back amplifier, the resistor 37 may be equal in value to resistor 35. If it be desired to carry the low-frequency compensation two octaves lower than that provided by the play-back or down to 2500 cycles, resistor 37 should have about four times the value of resistor 35, or 8,000 ohms, and so on, the resistance of resistor 37 increasing in inverse proportion to the desired lower cut-off frequency. It may be noted here that equalization to frequencies whose period is equal to several lines of the horizontal scanning frequency may be ample to give satisfactory results; the very low frequencies in a recorded picture can be followed and supplied by the D.C. restorer in the play-back amplifier if its time constant is short enough, say, equal to the period of a few lines only.

The voltage supplied to the anode circuit at B+ is preferably high enough so that, when the tube is drawing its normal anode current as set by the D.C. restorer and the cathode bias resistor 31, the potential at the junction of resistors 37 and 35 is equal to a normal or recommended anode potential for the tube. Condenser 39 will then assume, on the average, this anode potential.

The principles of operation of the circuit will best be understood by assuming that it is desired to record a frequency at which the impedance of resistor 37 is high in comparison with that of condenser 39. The low frequency considered will swing the grid alternately positive and negative, and because of the high dynamic impedance of the tube 13 the current in the anode-cathode circuit will vary substantially directly in proportion to the variation in grid voltage. Because the impedance of the condenser 39 is low in comparison with that of resistor 37, the path of the alternating component from anode to ground and back to the cathode is primarily through the condenser 39. Stated in another fashion, on positive grid swings the tube 13 discharges the condenser 39 much more rapidly than the charge can be replaced through resistor 37, and the drop in potential of the anode is equal to that due to the discharge of the condenser plus that due to the resistive drop through resistor 35. For very low frequencies the drop through resistor 35 is negligible in comparison with that due to condenser discharge. The potential on the plate continues ot fall as the grid voltage rises or remanis high until the junction of the condenser with the resistor 37 has dropped so low in comparison with B+ that resistor 37 can supply all the required plate current. Where the decrease in potential due to condenser charge and that due to voltage drop through resistor 37 become equal the compensation will be 3 db down; i.e., the output of the play-back amplifier at this frequency will be only of about 70% of the amplitude of higher frequency components of equal input amplitude. When the grid of tube 13 swings negative the condenser 39 charges instead of discharging, integrating the signal in opposite phase.

Thus far the process described is a simple, pre-recording integration. If, however, the signals were to be recorded directly the intensity of magnetization imposed upon the tape would be very high indeed, using up a great proportion of the dynamic range of the tape and greatly limiting the distortionless output power of the recording-reproducing system. The advantage of the present invention is that it so operates upon the signal that the build-up of magnetization of the tape is only that which occurs during one line of horizontal scanning.

This operation is accomplished in the portion of the output circuit of tube 13 that supplies the next stage of amplification. The voltage drop across the compensating circuit is taken off from the anode of tube 13 through a blocking condenser 41, which filters out the D.C. component of the anode voltage, and is connected directly to the grid of a cathode-follower triode 43*a*, which is conveniently one section of a dual tube, since it preferably forms one arm of an adding circuit, as will be described below. Triode 43*a* is not provided with the usual grid resistor; instead the grid is periodically grounded, during the blanking period at the end of each line, by a clamp circuit 44. This is illustrated as being of the well-known type comprising a pair of diode elements 45, 45′, connected in series, with the anode of the first connected to the cathode of the second. A resistor 47, having a center tap grounded, is bridged across the two diode sections. This arrangement effectively connects the grid of tube 43*a* to ground when a positive pulse is applied to the anode of tube 45. Other types of electronic switches for closing the circuit from the grid of tube 43 to ground may be employed, but the one shown is one of the simplest.

Pulses for operating the clamp circuit are shown as being derived from the sync generator 3, although where the signal to be recorded is not locally generated the pulses used may be derived by means of conventional sync separation circuits from the received signal. The horizontal drive pulse from the sync generator is supplied to a pulse former 49. This may, for example, be a monostable or "one-shot" multivibrator, which, in this case, is triggered by the leading edge of the horizontal drive pulse and generates a shorter pulse of 3 microseconds' duration. This 3-microsecond pulse is transmitted through two delay line sections, 51, 51′, each providing three microseconds' delay. The pulse for actuating the clamp circuit 44 is taken off from the end of the two delay line sections and applied to the clamp through a transformer 54 and two condensers 53. The clamp is therefore closed, grounding the grid of tube 43, during the final third of the 9-microsecond (very approximately) blanking pulse.

As a result of this arrangement, instead of the currents which magnetize the tape constantly increasing during the period when condenser 39 is charging, they are brought back to zero level at the end of each line, the clamp 44 effectively setting a new zero axis about which the higher frequencies oscillate each time the clamp operates. The rate-of-change of the magnetization on the tape remains the same as though the full increase in voltage had been applied to develop magnetization of the tape. This rate of change, however, continues for only a maximum of one line period, instead of a period many times as long. The result is that only a few db of the dynamic range of the tape are consumed in supplying the low frequency components of the signal.

In this particular system here described it is desired also to add to the recording signal a pulse indicative of the maximum white level signal to be recorded. This is supplied through an adding circuit comprising the second half of section 43*b* of the tube 43. One way of applying the white level pulse to the grid of this tube is indicated, but it is to be understood that other ways are known which would accomplish the same purpose and that shown is one chosen merely for purposes of illustration. Since it has been assumed that the signal has been delivered to the grid of tube 13 with positive signals indicating white, and has been reversed in polarity at the plate of tube 13, the white-level pulse must be negative. The white-level pulse represents the total maximum change in amplitude, with respect to black, of the recorded signals. It is inserted when the signals themselves are at black level. A negative pulse of constant amplitude, inserted at this point, will therefore give the desired maximum-amplitude difference between black and white levels.

Accordingly, there is provided a source of D.C. potential, such as the battery 55, which has its positive terminal grounded and its negative terminal connected to a potentiometer 57 and thence back to ground. The movable contact of this potentiometer may be set to a potential negative to ground by the amount of the desired pulse amplitude, in comparison with the level of the signal at the grid of triode 43*a*. The potentiometer contact connects through a conventional electronic switch 59, to the grid of the dual triode section 43*b* through a lead 61. The usual high resistance grid resistor 63 is provided to maintain the grid bias of this tube at the desired level. Electronic switch 59 is normally open; it is closed by 3-microsecond pulses from the pulse former 49, delayed by three microseconds through section 51 of the delay line. In place of the usual 9-microsecond blanking pulse, the recorded signals therefore have, first, a 3-microsecond pulse indicative of black level, then another 3-microsecond pulse indicative of white level, and finally a 3-microsecond pulse nominally representative of average level, although the important thing about this latter pulse is the interval in which it occurs rather than the level which it actually shows, since the grounding of the grid of triode 43*a* will usually develop an additional spurious pulse in one direction or the other.

The two sections of tube 43 constitute, together, an adding circuit of known type. Connected to the respective cathodes of the two sections are resistors 65*a* and 65*b* of equal value, connected together at the point 67. From this junction-point a common resistor 69 completes the circuit to ground. As is well understood, the voltage across resistor 69 is proportional to the sum of the potentials supplied to the grids of the two triode sections.

The resulting signal is that recorded. The voltage across resistor 69 is applied through a blocking condenser 71 to the grid of a cathode follower tube 73. The grid of this tube is maintained, on the average, at ground potential through grid resistor 75. The output voltage is taken off across cathode-resistor 77 and applied through blocking condenser 79 to a recording transducer head 81 for application to the recording tape, symbolically indicated by the reference character 83.

Figure 2:
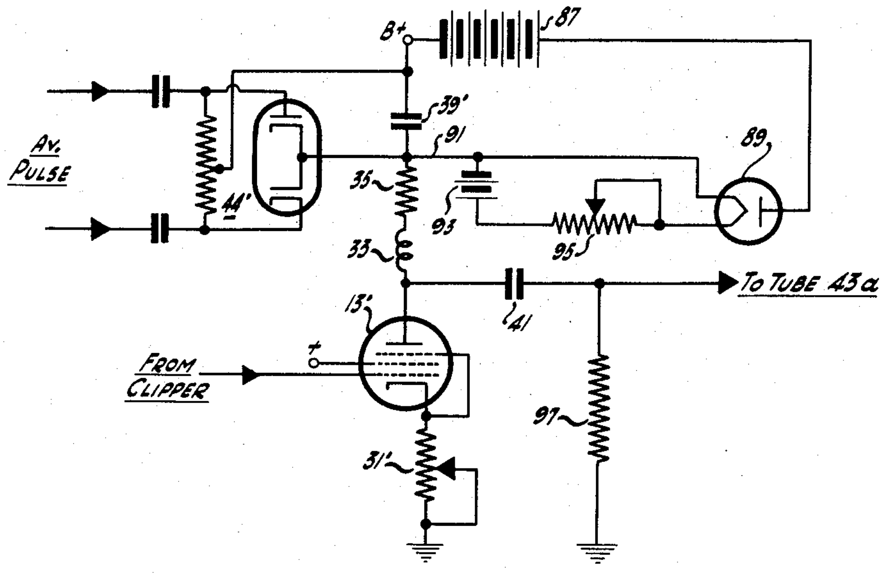
Fig. 2 is a schematic diagram illustrating a modified form of the portion of the apparatus illustrated in Fig. 1, with which this invention is particularly concerned.

As stated at the outset of the foregoing description, the apparatus thus described will, over its designed range, give a close approximation to complete compensation over the low frequency range of a few octaves. By substituting somewhat more complex apparatus for tube 13 and its associated circuits, theoretically complete compensation may be attained over an indefinitely wide range without overtaxing the tube. Since it is only tube 13 and its immediate connections, as enclosed in the dotted line D of Fig. 1 that differs from the arrangement there shown, Fig. 2 is limited to this portion of the circuit, the remainder being identical with Fig. 1. Those portions of the circuitry which are the same in both construction and operation as those shown in Fig. 1 are identified by the same reference characters; those which are similar in function but differ in either construction or the way in which the function is exercised carry the same reference characters as in Fig. 1 distinguished by accents.

Tube 13′, like tube 13, is provided with a cathode resistor 31′, which differs from cathode resistor 31 only in being adjustable. Peaking coil 33 and resistor 35 are identical with the corresponding elements of Fig. 1, but condenser 39′, while the same in capacity as condenser 39, is necessarily, instead of optionally, connected directly to B+ instead of to ground.

Bridged around condenser 39′ is a clamp circuit 44′ which, as it may be identical with clamp 44, need not be described in detail. Its effective resistance should be as low as possible, however, since it must discharge a larger capacity than clamp 44. This clamp is operated by a pulse generated and timed in the same manner as that applied to clamp 44. When the clamp operates it discharges condenser 39′, bringing its two terminals to B+ potential.

Also bridged around condenser 39′ is a circuit comprising a potential source 87 (which may be included in the same high tension D.C. supply as is used to provide B+ potential but is illustrated separately for purposes of explanation) in series with a diode 89. Although this diode may be of the heater type it preferably is one using a filamentary cathode, one end of which connects back to the junction between resistor 35 and condenser 39′ through a lead 91. In this case the cathode is heated from a separate source 93 which connects from lead 91 back to the other end of the cathode through a filament-control resistor 95.

Diode 89 is operated at saturation; the source 87 is of high enough voltage to collect all electrons emitted from the cathode even when the latter is several volts positive to B+, as it may be in the operation of the device.

The resistor 95 is set so that the saturation current of tube 89 is substantially equal to the average space current of tube 13′ as set by the D.C. restorer and the clipper and the cathode resistor 31′ of tube 13′; a slight inequality here does no harm since it merely displaces the zero axis slightly. The adjustment may be made statically since signals are supplied to the tube at a fixed level. Since the diode 89 is saturated under all conditions of operation of tube 13′ its effective A.C. impedance is infinite. Tube 13′, however, draws a varying space current, in accordance with the voltage applied to its control grid. When the control grid swings negatively tube 13′ draws less current than is supplied to the condenser 39′ by the diode 89 and therefore it charges positively whereas, when the control grid swings positive with respect to its average potential condenser 39′ charges negatively. The condenser therefore integrates all components of the signals as supplied to tube 13′ except when the clamp 44′ is operated by the average-setting pulse, during which interval it discharges. A grid resistor 97 is provided for triode 43*a* in place of the clamp 44 of Fig. 1.

The circuit shown in Fig. 2 substituted for the corresponding elements in Fig. 1 will give complete compensation down to and including D.C. components of the recorded signal. Very nearly as good results may, however, be obtained by substituting for the diode 89 a resistor of a value of, say, approximately a few hundred times greater than resistor 35, supplied by a positive voltage exceeding that of B+ sufficiently to pass a current through this resistor equal to the average space current of tube 13′. It can be shown that with the circuit thus modified, the error, as compared to the compensation provided when the diode 89 is used, amounts to only about one or two percent, and since this error is spread over an entire line of the picture when the recording is reproduced and displayed, amounting to an extremely gradual increase or decrease in illumination level across the line, it is practically undetectable visually.

Conversely, the diode arrangement for supplying the average plate current can be used with tube 13 in the arrangement of Fig. 1, replacing resistor 37. In this case the low-frequency cut-off is determined by the characteristics of the tube instead of by the partially integrating circuit. Assume, for purely illustrative purposes, that tube 13 is of type 6J7 supplied with input signals at a level which will develop a swing of one volt across resistor 35, and that the diode supplies two milliamperes space current to this tube from a source of sufficiently high potential to maintain the junction between resistor 35 and condenser 39 at 250 volts positive with respect to the cathode. At 60 cycles the maximum swing of the integrated voltage across the condenser 39 will be 167 volts; from about 41 volts to about 208 volts, within which range the mutual conductance of the tube 13 varies by about five percent. A thirty cycle component of equal amplitude would result in a negative swing of over 300 volts, exceeding the dynamic range of the tube. Swings of this magnitude and frequency are not, however, of practical importance since successive frames are highly unlikely to differ in illumination to any such extent as this would involve except upon a total change of scene and in this case the change in D.C. level is taken care of by the time-constant of the D.C. restorer.

The two arrangements of Figs. 1 and 2, with the two modifications of each with respect to supply of normal plate current to the tubes, are therefore substantial equivalents, differing primarily with regard to the point in the output circuit of the tube which is restored to reference level at the end of each line of the picture. The arrangement of Fig. 1 has the advantage that the capacitor 41 which is actually discharged when the clamp circuit 44 operates has a very small capacity, a few micromicrofarads at most, and therefore the grid of the succeeding tube **43*a* can be brought to ground level practically instantaneously even though the effective resistance of the clamp circuit 44 is fairly high. With the arrangement of Fig. 2, on the other hand, the total charge on the condenser 39′ must be discharged and the clamp resistor must be of low resistance in order to complete the discharge within the 3 microseconds allotted to the discharge in the particular form of apparatus shown. On the other hand, under the same assumptions as to the tube used and the signal amplitude applied to it as in the discussion of the frequency limitations of Fig. 1, the maximum voltage that would appear across the condenser 39′ is about 3.4 volts, a swing which the tube can follow with a high degree of linearity even though the anode supply is arranged to maintain the average voltage of the junction between resistor 35 and condenser 39′ at only 100 volts. With the arrangement of Fig. 2 but with a resistor substituted for the diode 89 the resistor does not have the same low-frequency cut-off effect as it does in the Fig. 1 arrangement because the condenser 39′** does not continue to charge during the continuance of a low-frequency half-cycle. A 200 K charging resistor requires 400 volts to supply 2 ma. space current. The maximum variation in condenser charge and hence in the effective drop across this resistor is less than 1% in the case used for illustration. Each modification of the invention has its advantages and which form is used therefore becomes very largely a matter of engineering judgment. The apparatus of Fig. 2 has no lower frequency limit whereas that of Fig. 1 has, but this difference may or may not be important, depending upon the particular conditions under which the amplifiers are used and the characteristics of the apparatus with which they are associated.

It will be recognized that if desired for any reason the clamp circuit can be connected in any portion of the amplifier chain succeeding the tube in which the integration is actually accomplished. As far as the resultant signal is concerned it could be the grid of tube 73 which was grounded by the operation of a clamp, substituted for grid resistor 75, while the grid of tube **43*a*** could be biased through a resistor.

It should be therefore apparent that numerous embodiments of the invention are possible within the scope of the claims which follow.

What is claimed is:

1. A circuit arrangement for preemphasizing a band of lower frequency components of broadband signals cyclically interspersed with pulses representative of a reference amplitude level, which comprises, a first amplifier the output current whereof varies substantially in proportion to variations in its input voltage, an output circuit for said first amplifier consisting essentially of a resistor and a condenser of equal impedance to said resistor at the upper cutoff frequency of said band in series with said device, a second amplifier, connecting means coupled between said second amplifier and said output circuit for applying alternating components only of the voltage drop across said condenser to said second amplifier, means for supplying actuating pulses timed to coincide with the reference level pulses in the signals to be amplified, and a clamp circuit coupled to said actuating pulse supplying means and to said output circuit and responsive to each of the actuating pulses from said actuating pulse supplying means to apply to said output circuit a predetermined potential whereby the amplitude level of the signals to said second amplifier is successively returned to a predetermined level.

2. An amplifier in accordance with claim 1 wherein said clamp circuit is connected from ground to said connecting means for applying the alternating components of the voltage drop to said amplifier.

3. An amplifier in accordance with claim 1 wherein said clamp circuit is connected across said condenser.

4. An amplifier in accordance with claim 1 including means connected in parallel with said condenser for supplying a direct current component of current to said amplifying device.

5. An amplifier in accordance with claim 4 wherein said means connected in parallel with said condenser is a current-saturable diode.

6. A recording circuit arrangement for pre-emphasizing signal components of lower frequency than the low-frequency cutoff frequency of a magnetic recording-reproducing system for wideband signals interspersed with cyclically recurring blanking pulses, comprising an amplifier tube having at least a control grid and an anode, terminals for applying the signals to be recorded to said control grid, a wave-shaping output circuit for said amplifier tube including a resistor and a condenser of higher impedance than said resistor to said lower frequency signal components, means coupled to said anode for serially connecting said resistor and said condenser with said anode, a succeeding amplifier tube, means coupled to said condenser for applying the alternating components only of the voltage drop across said condenser and said resistor to said succeeding amplifier tube, means timed with said blanking pulses for supplying actuating pulses, and a clamp circuit connected to said output circuit and responsive to each actuating pulse from said supplying means to bring said alternating current applying means to a predetermined potential.

7. A pre-emphasizing circuit arrangement for pre-emphasizing a band of lower frequency components of broadband signals cyclically interspersed with pulses representative of a reference amplitude level, including, an amplifying device for receiving the broadband signals to be amplified and for providing output currents varying substantially in proportion to variations in the voltage of said received broadband signals, an integrating circuit coupled to said amplifying device and effective for the band of lower frequency components of the broadband signals for providing a signal increasing in amplitude at a rate which varies substantially inversely with frequency, a clamping circuit coupled to said integrating circuit for cyclically restoring the level of the signals from said integrating circuit to a predetermined level, and means coupled to said clamping circuit for maintaining the cyclic operation of said clamping circuit in synchronism with said reference amplitude pulses.

8. A circuit arrangement for pre-emphasizing a band of lower frequency components of broadband signals, including, means for receiving said broadband signals and for integrating said band of lower frequency components of said broadband signals to provide signals related to said broadband signals, means coupled to said receiving and integrating means for periodically interrupting the integration of said broadband signals by returning the instantaneous value of said related signals to a predetermined reference value, means coupled to said interrupting means for introducing said interrupted related signals for recording, and a recording medium coupled to said introducing means for providing a recorded representation of said interrupted related signals.

9. An amplifier for pre-emphasizing a band of lower frequency components of broadband signals, including, means for receiving said broadband signals and for integrating said band of lower frequency components of said broadband signals to provide signals related to said broadband signals, means coupled to said receiving and integrating means for introducing said integrated signals for recording, and a recording medium coupled to said introducing means for providing a recorded representation of said integrated signals.

References Cited in the file of this patent

UNITED STATES PATENTS

| | | |
|---|---|---|
| 2,273,934 | Campbell | Feb. 24, 1942 |
| 2,299,944 | Wendt | Oct. 27, 1942 |
| 2,299,945 | Wendt | Oct. 27, 1942 |
| 2,416,308 | Grieg | Feb. 25, 1947 |
| 2,539,774 | Gluyas | Jan. 30, 1951 |
| 2,637,772 | Wendt | May 5, 1953 |
| 2,708,687 | Schlesinger | May 17, 1955 |
| 2,829,247 | Thomas | Apr. 1, 1958 |
| 2,834,882 | Sonnenfeldt | May 13, 1958 |